US009231787B1

(12) United States Patent
Zamani et al.

(10) Patent No.: US 9,231,787 B1
(45) Date of Patent: Jan. 5, 2016

(54) METHOD AND APPARATUS WITH IMPROVED ESTIMATION ACCURACY AND ROBUSTNESS FOR FINE FREQUENCY OFFSET ESTIMATION IN COHERENT RECEIVERS

(71) Applicant: HUAWEI TECHNOLOGIES CANADA CO., LTD., Kanata (CA)

(72) Inventors: Mahdi Zamani, Ottawa (CA); Zhuhong Zhang, Ottawa (CA); Chuandong Li, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/603,890

(22) Filed: Jan. 23, 2015

(51) Int. Cl.
*H04L 27/06* (2006.01)
*H04L 25/02* (2006.01)

(52) U.S. Cl.
CPC .................................. *H04L 25/024* (2013.01)

(58) Field of Classification Search
CPC . H04B 10/611; H04B 10/613; H04B 10/6161
USPC .............. 375/316, 340; 398/25, 65, 184, 186, 398/205
See application file for complete search history.

(56) References Cited

U.S. PATENT DOCUMENTS

| | | | |
|---|---|---|---|
| 7,596,182 B1* | 9/2009 | Lee et al. ....................... | 375/262 |
| 7,606,498 B1* | 10/2009 | Wu et al. ....................... | 398/152 |
| 8,218,665 B2* | 7/2012 | Chin et al. .................... | 375/262 |
| 8,335,438 B2* | 12/2012 | Kim et al. ..................... | 398/154 |
| 8,767,575 B2 | 7/2014 | Zhang et al. | |
| 2007/0041735 A1* | 2/2007 | Darcie et al. .................. | 398/186 |
| 2010/0003028 A1* | 1/2010 | Zhang et al. ................... | 398/65 |
| 2012/0148266 A1* | 6/2012 | Komaki et al. ............... | 398/210 |
| 2014/0099103 A1* | 4/2014 | Djordjevic et al. ............ | 398/25 |
| 2014/0212132 A1* | 7/2014 | Saito et al. ....................... | 398/25 |
| 2014/0226971 A1* | 8/2014 | Vassilieva et al. .............. | 398/25 |
| 2015/0071630 A1* | 3/2015 | Oyama et al. .................. | 398/25 |

OTHER PUBLICATIONS

Ip et. al, "Feedforward Carrier Recovery for Coherent Optical Communications," Journal of Lightweight Technology, Sep. 2007, vol. 25, No. 9, pp. 2675-2692.
Pfau et. al, "Hardware-Efficient Coherent Digital Receiver Concept with Feedforward Carrier Recovery for M-QAM Constellations," Journal of Lightweight Technology, Apr. 15, 2009, vol. 27, No. 8, pp. 989-999.
Cao et. al, "Frequency Estimation for Optical Coherent MPSK System Without Removing Modulated Data Phase," IEEE Photonics Technology Letters, May 15, 2010, vol. 22, No. 10, pp. 691-693.

(Continued)

*Primary Examiner* — Freshteh N Aghdam
(74) *Attorney, Agent, or Firm* — Gowling LaFleur Henderson LLP

(57) ABSTRACT

The present disclosure provides a method and system for fine estimation of a local oscillator frequency offset of a received signal at a coherent receiver, by evaluating the probability mass function (PMF) of the signal phase of output symbols at different frequencies. At frequencies other than the actual frequency offset, the signal phase is uniformly distributed in $[-\pi,\pi]$ such that the summation of square of PMF (PMF sum-square) values is minimized. However at the actual frequency offset, the signal phase is no longer uniformly distributed over $[-\pi,\pi]$; in other words the signal phase will take some specific values in $[-\pi,\pi]$, therefore a peak PMF sum-square value will result. This peak PMF value provides an indication of the actual offset frequency of the received signal.

20 Claims, 9 Drawing Sheets

(56) References Cited

OTHER PUBLICATIONS

Leven et. al, "Frequency Estimation in Intradyne Reception," IEEE Photonics Technology Letters, Mar. 15, 2007, vol. 19, No. 6, pp. 366-368.

Selmi et. al, "Accurate Digital Frequency Offset Estimator for Coherent PolMux QAM Transmission Systems," ECOC 2009, Sep. 20-24, 2009, Vienna, Austria, 2 pages.

Dris et. al, "Phase Entropy-Based Frequency Offset Estimation for Coherent Optical QAM Systems," OFC/NFOEC, Technical Digest, Mar. 2012, 3 pages.

Zhou et. al, "High Spectral Efficiency 400 Gb/s Transmission Using PDM Time-Domain Hybrid 32-64 QAM and Training-Assisted Carrier Recovery," Journal of Lightwave Technology, Apr. 1, 2013, vol. 31, No. 7, pp. 999-1005.

Bornoosh et. al, "Design and Analysis of a Reduced Phase Error Digital Carrier Recovery Architecture for High-Order Quadrature Amplitude Modulation Signals," IET Communications, May 2010, vol. 4, No. 18, pp. 2196-2207.

Zhou et. al, "An Improved Feed-Forward Carrier Recovery Algorithm for Coherent Receivers With M-QAM Modulation Format," IEEE Photonics Technology Letters, Jul. 15, 2010, vol. 22, No. 14, pp. 1051-1053.

Ke et. al, "Linewidth-Tolerant and Low-Complexity Two-Stage Carrier Phase Estimation for Dual-Polarization 16-QAM Coherent Optical Fiber Communications," Journal of Lightwave Technology, Dec. 15, 2012, vol. 30, No. 24, pp. 3987-3992.

\* cited by examiner

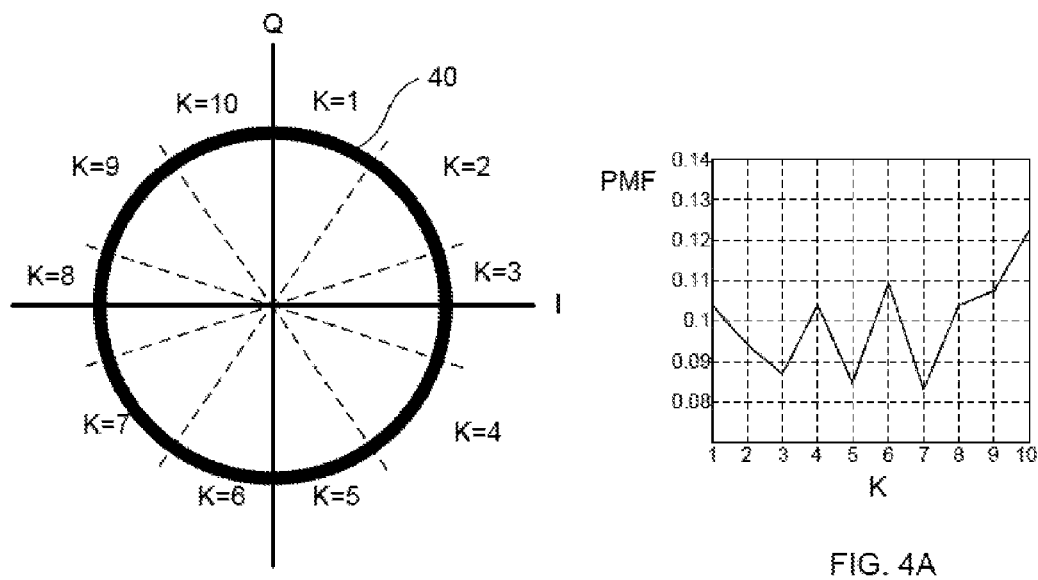
FIG. 3A
FIG. 4A
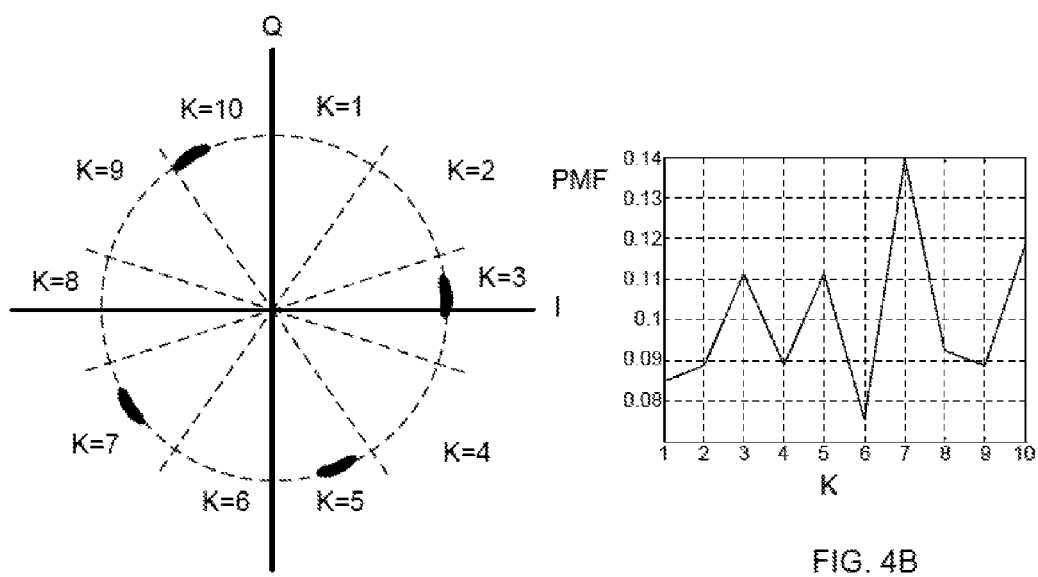
FIG. 3B
FIG. 4B

METHOD AND APPARATUS WITH IMPROVED ESTIMATION ACCURACY AND ROBUSTNESS FOR FINE FREQUENCY OFFSET ESTIMATION IN COHERENT RECEIVERS

FIELD

The present disclosure relates generally to determining frequency offset of a received signal in a data transmission system.

BACKGROUND

The delivery of data content to users, which can include for example Internet content, media content, and voice communications, is provided through a distributed data network. FIG. 1 is an example data network diagram showing how service provider 10 provides data content to end users at their homes or office buildings 12, or wherever they may be located. Depending on geographical area to be covered, various intermediate nodes may be required to distribute the data content to the end users 12. In the example of FIG. 1, regional nodes 14 can function as a data delivery node to users in vicinity of the regional nodes 14, and can function as a repeater for redistributing the data content received from the service provider 10 to base stations 16. Base stations 16 can be located in a neighborhood to facilitate delivery of data content to the homes or buildings 12 located nearby. The base stations 16 can be configured to provide wireless services to users as well. It should be appreciated that the number of intermediate nodes between the service provider 10 and the end users 12 can be adjusted depending on the required geographical coverage of the data services.

The medium for carrying the signals representing the data content between the nodes, such as between service provider 10 and the regional node 14, between the regional node 14 and the base stations 16, and between the base stations 16 and the homes or buildings 12 are data cables 18, 20 and 22. These data cables can be electrical conducting cables made of copper, or they can be optical cables which carry data in the form of modulated laser light. It is well known that optical cables have a much larger data bandwidth than copper cables, and have the benefit of low signal loss over long distances. That being said, optical data transmission is still subject to various phenomena which can distort the optical signal, and must be compensated for in order to recover the transmitted data.

FIG. 2 is a simplified diagram of an optical data transportation link 30, which includes a transmitter 32 and a coherent receiver 34 connected to each other by an optical propagation channel 36. Each pair of nodes shown in the example data network diagram of FIG. 1 can have the optical data transportation link 30 presently shown in FIG. 2.

The transmitter 32 generates an optical signal comprised of two orthogonal linear polarization components (X and Y), wherein each component is comprised of two orthogonal phase components (in-phase I and quadrature Q) that have the same carrier frequency. The carrier frequency is an optical wavelength supplied by a laser with phase noise. The propagation channel 36 is comprised of optical filters such as cascaded WSS, fiber, amplifiers that are the sources of chromatic dispersion (CD), nonlinear phase noise, polarization mode dispersion (PMD), polarization dependent loss (PDL), polarization dependent gain, polarization rotation and optical white Gaussian noise.

The coherent receiver 34 is comprised of an integrated coherent receiver, photo detectors (PIN), analog to digit converters (ADC) and a DSP unit. The integrated coherent receiver 34 is the place where a local oscillator (LO), with a frequency that is closely matched to the transmitter laser, mixes with a propagated optical signal and splits it to four signals with each being a mixture of transmitted signals. The DSP unit is where signals are processed and data are recovered. Further details of all the above mentioned components are discussed later.

One of the problems with optical transmission is frequency wander, where a frequency shift in the base band signal occurs relative to the frequency at the transmitter 32. This is referred to as local oscillator frequency offset (LOFO), and the resulting signal at the receiver 34 has a frequency that is not exactly matched with that of the transmitter 32. The LOFO needs to be corrected at the receiver 34 in order to recover data in the optical signal. In some currently known systems, the LOFO can be as large as ±5 GHz.

Most known solutions follow a two-step approach for determining the frequency offset of the received signal. First a coarse frequency offset estimator (FOE) can estimate and correct LOFO to less than ±1 GHz estimation error. Then a fine estimation is executed to determine the final LOFO with an estimation error of less than 10 MHz. However, most known fine LOFO estimator solutions are very complex and thus costly to implement, vulnerable to different types of impairments which increase the estimation error beyond an expected threshold, or are only effective for specific modulation formats such as BPSK and QPSK but not for other formats which must also be supported by the same product.

While some of the above mentioned techniques can be used, they may not be effective for newer systems capable of increased bandwidth and increased modulation. In other words, application of the currently known techniques for frequency offset estimation could result in a very slow data recovery time at the coherent receiver 34, or worse, the coherent receiver 34 may simply fail.

It is, therefore, desirable to provide a fine LOFO estimator system and method that is simple to implement, accurate in fine frequency offset estimating, and universal such that it is compatible with all systems.

SUMMARY

It is an object of the present disclosure to obviate or mitigate at least one disadvantage of previous fine frequency offset estimation techniques.

In a first aspect, the present disclosure provides a method for estimating a frequency offset of a signal received at a coherent receiver. The method includes iteratively receiving equalized symbols at different frequencies and then processing probability mass function (PMF) of the equalized symbols to provide a summation of square of PMF values at each of the different frequencies. Once the summation of square of PMF values have been determined, a maximized summation of square of PMF values is identified along with the frequency corresponding to the maximized summation of square of PMF values. This frequency is set as the estimated frequency offset for the coherent receiver.

In a second aspect, the present disclosure provides a frequency offset estimator for a coherent receiver. The frequency offset estimator includes a probability mass function (PMF) extractor, a PMF processor, and a PMF identifier. The PMF extractor is configured to determine phases of equalized symbols, and to determine individual probability mass function values of the phases at each frequency within a range of frequencies. The PMF processor is configured to square and sum the individual probability mass function values to provide a summation of the square of PMF values for each frequency. The PMF identifier is configured to identify the largest summation of square of PMF values and the corresponding frequency, such that the corresponding frequency is an estimated frequency offset for the coherent receiver.

In a third aspect, the present disclosure provides an optical coherent transportation link. The optical coherent transportation link includes a transmitter, an optical channel and a coherent receiver. The transmitter generates an optical signal. The optical channel is configured to receive and transport the optical signal of the transmitter. The coherent receiver receives the optical signal from the optical channel and is configured to provide equalized symbols corresponding to the optical signal. The coherent receiver includes a frequency offset estimator and a carrier phase recovery circuit. The frequency offset estimator is configured to process probability mass function (PMF) of the equalized symbols to provide a summation of square of PMF values at different frequencies, and is configured to identify one frequency corresponding to a maximized summation of square of PMF values. The carrier phase recovery circuit is configured to correct a phase of the equalized symbols based on the one frequency.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

FIG. 3A is an example phase constellation diagram showing a uniform distribution of phases of output symbols;

FIG. 3B is an example phase constellation diagram showing non-uniform distribution of phases of output symbols;

FIG. 4A is an example plot of PMF versus K sectors at a frequency other than the actual frequency offset;

FIG. 4B is an example plot of PMF versus K sectors at a frequency corresponding to the actual frequency offset;

DETAILED DESCRIPTION

Figure 1:
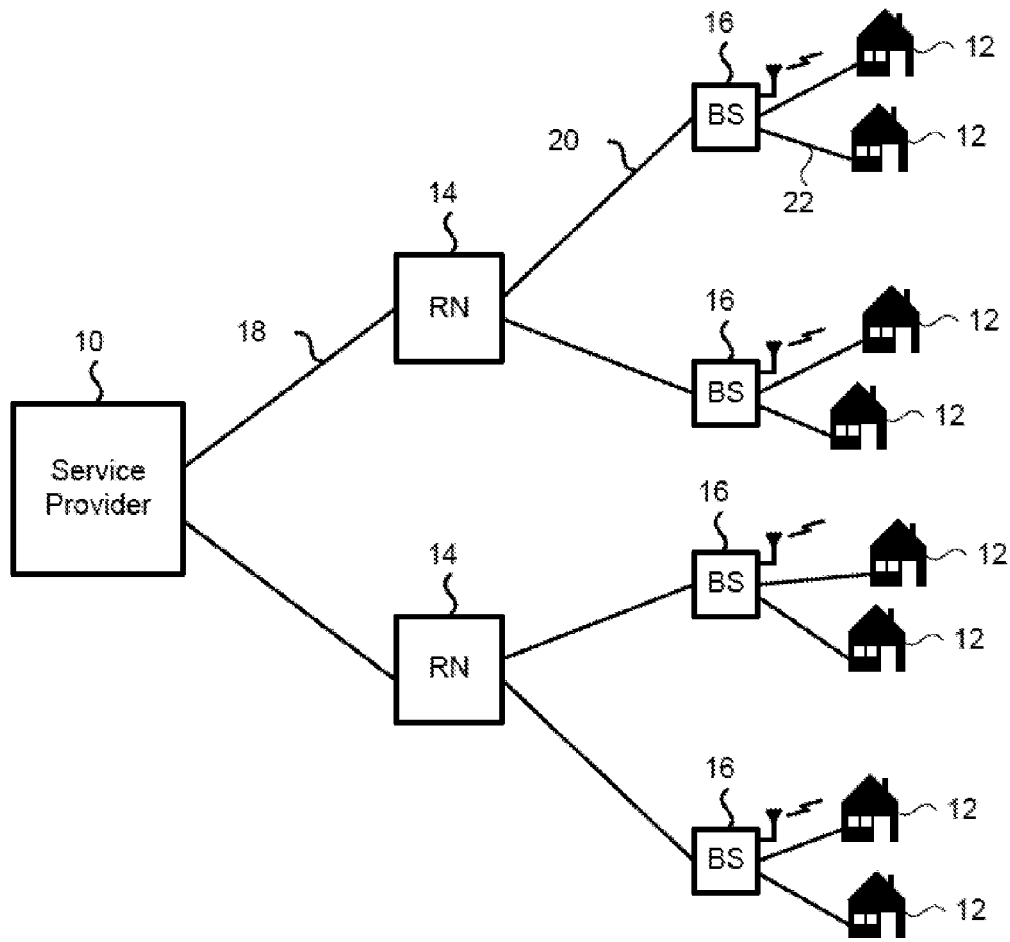
FIG. 1 is a data network diagram of the prior art.
Figure 2:
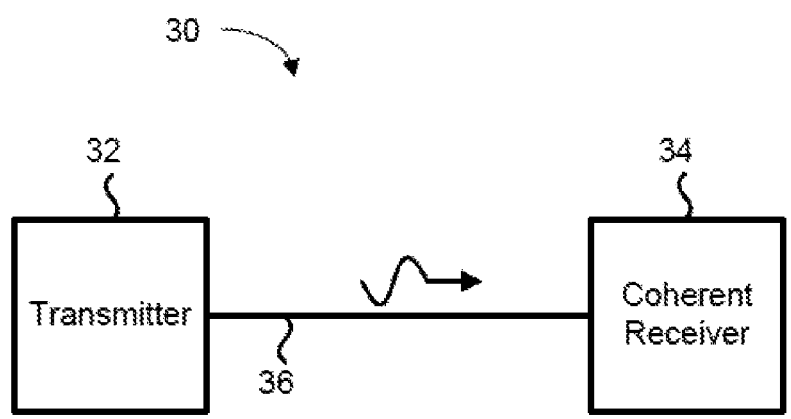
FIG. 2 is a diagram of an optical data transportation link of the prior art.

Although the embodiments and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The present disclosure provides a method and system for fine estimation of a local oscillator frequency offset of a received signal at a coherent receiver, by evaluating the probability mass function (PMF) of the signal phase of equalized symbols at different frequencies. At frequencies other than the actual frequency offset, the signal phase is uniformly distributed in $[-\pi,\pi]$ such that the summation of square of PMF (PMF sum-square) values is minimized. However at the actual frequency offset, the signal phase is no longer uniformly distributed over $[-\pi,\pi]$; in other words the signal phase will take some specific values in $[-\pi,\pi]$, therefore a peak PMF sum-square value will result. This peak PMF value provides an indication of the actual offset frequency of the received signal.

The presently described embodiments utilize the PMF of the phase of the output symbols to determine the actual frequency offset at the coherent receiver. It is noted that the present embodiments are described within the context of coherent optical receiver systems, but the embodiments are equally applicable to wireless or other electrically wired receiver systems which employ a coherent receiver.

Prior to a detailed discussion of method and apparatus embodiments for determining the actual frequency offset in a coherent receiver, a further explanation of the relationship between PMF and output signal phase follows.

FIG. 3A is an example phase constellation diagram for a set of output symbols at a specific frequency of evaluation. In the example of FIG. 3A, the phase constellation has been divided into K=10 different sectors, or bins, and it is assumed that the signal phases of output symbols at a specific frequency of the coherent receiver has been determined and plotted on this phase constellation diagram. The resulting plot in the example of FIG. 3A is intended to show a uniform distribution of the symbol phases in the range of $[-\pi,\pi]$, and thus appears as a solid circle 40 if sufficient symbols are evaluated. This means there is a substantially uniform distribution PMF for the phases of the output symbols to be in each of the K sectors. If the PMF of the phase of the output symbols in the coherent receiver is represented by $p_i$ (individual probability mass function values), then the summation of $p_i$ ($\Sigma p_i$)=1, where $p_i \geq 0$. To minimize $\Sigma p_i^2$, using Lagrange multipliers, one can show that the uniform distribution, i.e. all equal $p_i$, minimizes $\Sigma p_i^2$. This uniform distribution of the phases of the output symbols corresponds to a situation where frequency offset is not the actual frequency offset of the received signal.

In contrast, FIG. 3B is an example phase constellation diagram for a set of output symbols at the actual frequency offset. At the actual frequency offset of the received signal, the phases of the output symbols will appear at M sectors out of K sectors, where M<K. In the present example of FIG. 3B, the phases of the output symbols will appear at K=3, K=5, K=7 and K=10, but will not appear in the remaining sectors. Accordingly, the phases are not uniformly distributed as in the example of FIG. 3A, and the $\Sigma p_i^2$ of FIG. 3B results in a peak value that is greater than that of FIG. 3A. Therefore, by defining a local oscillator frequency offset evaluation (LOFOE) criterion as $J_{DFS}(f_{DFS})=\Sigma p_i^2$, where $f_{DFS}$ is the sweep frequency, a peak in the LOFOE criterion $J_{DFS}$ will be observed at the sweep index representing the actual frequency offset (FO). It is noted that the LOFOE criterion $J_{DFS}$ is a PMF based value. A sweep frequency can be one of a range of different frequencies separated by a predetermined step size, used to evaluate a particular $J_{DFS}$. A sweep index designates each of these distinct frequencies with an arbitrary integer number. From this point forward, $J_{DFS}$ is referred to as a PMF sum-square value.

FIG. 4A is an experimental plot of PMF for the different K sectors for a frequency that is not the actual frequency offset, using a limited set of output symbols. The PMF here correlates to a more uniform distribution of the phases. FIG. 4B is an experimental plot of PMF for the different K sectors for a frequency corresponding to the actual frequency offset of the received signal at the coherent receiver. It is clearly shown that the PMF correlates to a non-uniform distribution indicative of a frequency at or close to the actual frequency offset. It should be noted that the plots of FIGS. 4A and 4B do not represent the example phase plots of FIGS. 3A and 3B.

The value of K is set based on the desired level of phase detection resolution. A higher K results in a larger number of smaller sectors, which will increase accuracy of the actual frequency offset estimation. Generally, as higher K is used, more memory is required as will be discussed later. A low K value may not be useful as the resolution could be insufficient to distinguish between one frequency where the phase distribution of the output symbols is distributed uniformly and another frequency corresponding to the actual frequency offset where the phase distribution of the output symbols is distributed non-uniformly. Therefore the lower limit of K for a specific coherent receiver system can be set as the lowest integer value before a non-uniform phase distribution can no longer be distinguished from a uniform phase distribution.

Figure 5:
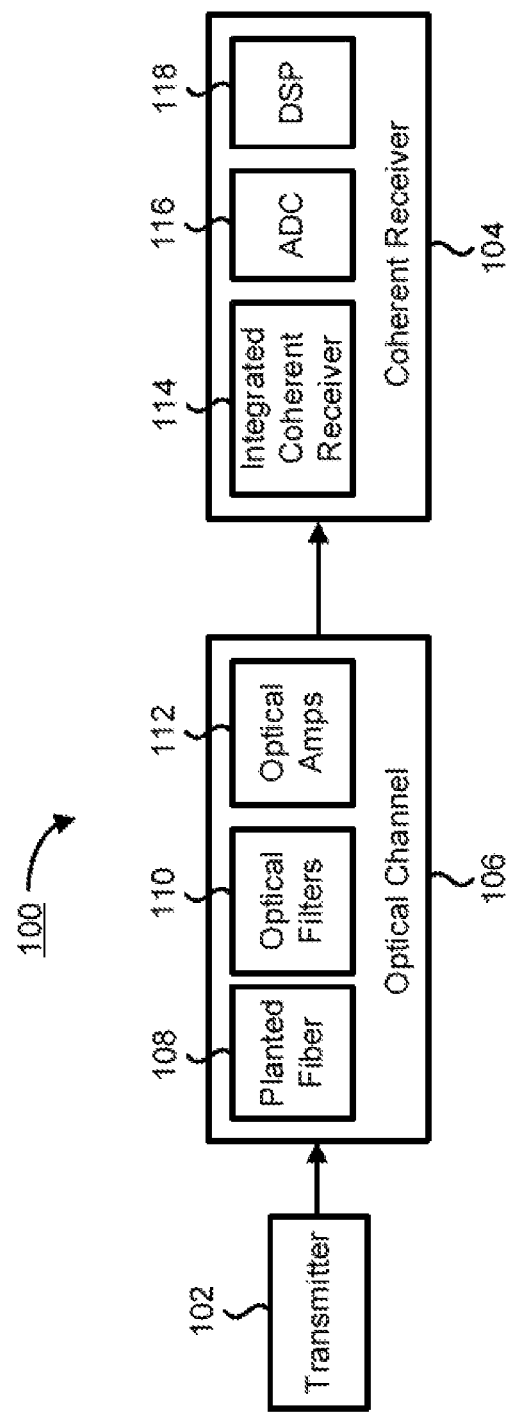
FIG. 5 is a block diagram of an example optical coherent transportation link according to a present embodiment.

With the principles above in mind, embodiments for a method and apparatus for determining the actual frequency offset of a signal received by a coherent receiver can be developed. FIG. 5 is a block diagram of a coherent optical transportation link which uses the method and apparatus according to the present embodiments. The optical coherent transportation link 100 includes a transmitter 102 and a coherent receiver 104 communicatively coupled through an optical channel 106. The optical channel 106 includes planted fiber 108, optical filters 110 and optical amplifiers 112. The coherent receiver 104 includes an integrated coherent receiver 114, an analog to digital converter (ADC) 116, and a digital signal processor (DSP) unit 118. In fiber optics digital coherent receivers, such as coherent receiver 104, quasi-static channel impairments and also component impairments such as chromatic dispersion (CD), state-of-polarization (SOP) rotations, polarization mode dispersion (PMD), polarization-dependent loss (PDL), laser phase noise, PPM, frequency offset, I-Q and X-Y delay, I-Q imbalance, etc. are compensated digitally in DSP unit 118. According to the present embodiments, a frequency offset (FO) determinator that is configured to evaluate the previously mentioned PMF sum-square value $J_{DFS}(f_{DFS})=\Sigma p_i^2$ for determining the actual frequency offset of a received signal, is implemented in the DSP unit 118 with transistor circuitry and/or predetermined circuit blocks having specific functions.

Figure 6:
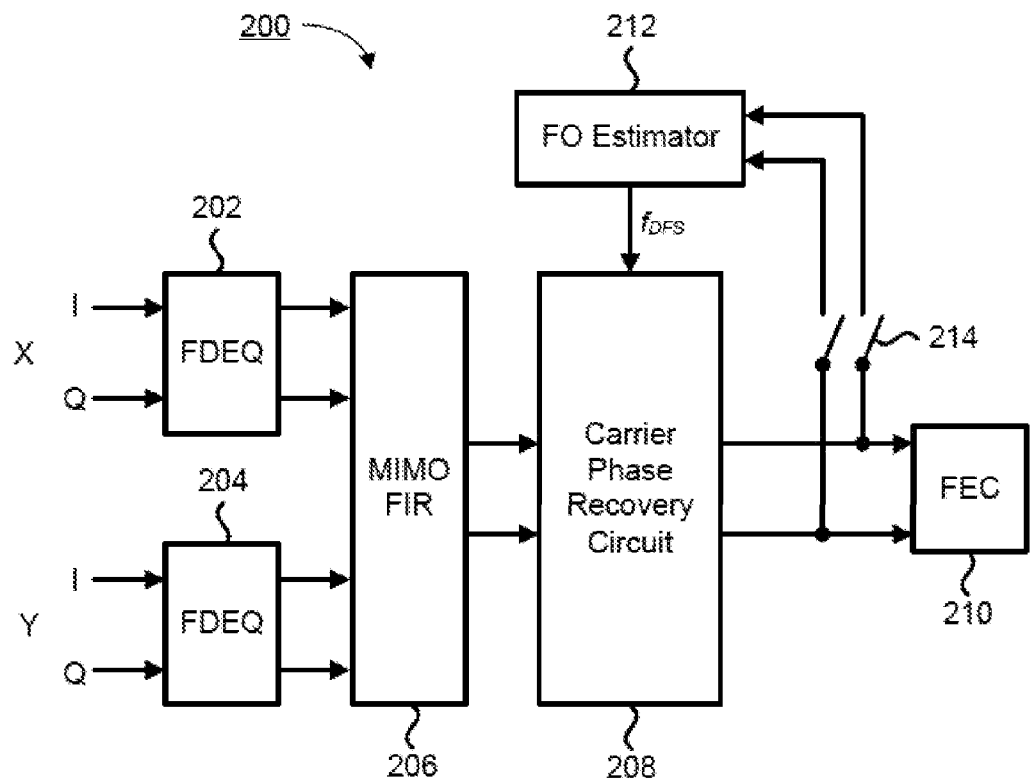
FIG. 6 is a block diagram of example data recovery circuitry used in the system of FIG. 5, according to a present embodiment.

FIG. 6 is an embodiment of a block diagram of data recovery circuitry in the DSP unit 118 of FIG. 5. In the presently shown data recovery circuit embodiment of FIG. 6, different circuit blocks compensate individual impairments in an efficient way to minimize the complexity of the overall circuit. Alternately, it is possible to compensate for all impairments in one equalizer circuit block which would require a complicated MIMO-IIR adaptive equalizer with a large number of taps. The data recovery circuit 200 of FIG. 6 includes frequency domain equalizers (FDEQ) 202 and 204, a time domain equalizer such as MIMO-FIR 206, a carrier phase recovery circuit 208, a forward error correction (FEC) circuit 210, an FO estimator 212 and switches 214.

Since CD is a quasi-deterministic impairment with very long echo, CD compensation (CDC) is done in a static frequency domain equalizer, namely by FDEQ 202 and 204. FDEQ 202 compensates for CD and match filtering of the horizontal polarization of the received signal, while FDEQ 204 compensates for CD and match filtering of the vertical polarization of the received signal. Afterwards, polarization dependent impairments are compensated through an adaptive time-domain butterfly structure of MIMO-FIR 206. More specifically, MIMO-FIR 206 executes SOP, PDL and PMD equalization, by example. Then carrier phase recovery circuit 208 corrects for laser line-width and phase noise of the equalized signals from MIMO-FIR 206 in each polarization. The FEC circuit 210 then executes error correction upon actual data.

Figure 7:
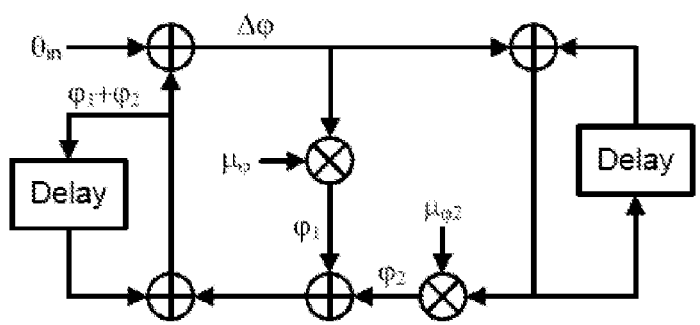
FIG. 7 is a circuit schematic of an example $2^{nd}$ order PLL used in the carrier recovery circuitry of FIG. 6, according to a present embodiment.

The carrier phase recovery circuit 208 includes a $2^{nd}$ order PLL (phase locked loop) which is used for correcting the phase of the received signal relative to a reference frequency estimation provided by the FO estimator 212. For reference, FIG. 7 shows a $2^{nd}$ order PLL of a particular configuration which could be used in carrier phase recovery circuit 208. In FIG. 7, $\phi_1$ represents phase correction error, $\phi_2$ represents frequency offset correction. The PLL circuit of FIG. 7 adjusts $\phi_2=2\pi f_{DFS}/f_{Baud}$, where $f_{DFS}$ is provided by FO estimator 212 of FIG. 6, and $f_{Baud}$ is i the baud rate of the system. In FIG. 7, $\mu_\phi$ and $\mu_\phi$ are small step size values in LMS adaptation for the phase and frequency track, respectively. $\Delta\phi$ is the error signal of PLL that is the difference between the received signal phase and estimated phase. $\phi_1+\phi_2$ is the estimated phase from PLL.

In the present embodiment, the FO estimator 212 includes PMF evaluation circuitry for executing estimation of the actual frequency offset based on the earlier discussed $J_{DFS}(f_{DFS})=\Sigma p_i^2$ criteria for estimating the actual frequency offset of the received signal. The switches 214 represent the functional turning on and off of the FO estimator 212. More specifically, the FO estimator 212 is used during initial signal acquisition of the coherent receiver, such as after a reset event of the coherent receiver where receiving operations are ceased. Accordingly in the example of FIG. 6, switches 214 are closed to couple the signal output from carrier phase recovery circuit 208 to FO estimator 212 after a reset event, and opened after the FO estimator 212 has provided the actual frequency offset to carrier phase recovery circuit 208. While the FO estimator 212 is enabled, it evaluates the output of the carrier phase recovery circuit 208 at different frequencies to eventually determine the actual frequency offset. Once determined, this actual frequency offset is stored and used by carrier phase recovery circuit 208 to extract data. It is noted that the FO estimator 212 can be used with any carrier phase recovery circuit similar to the one shown and described in the embodiment of FIG. 6.

Figure 8:
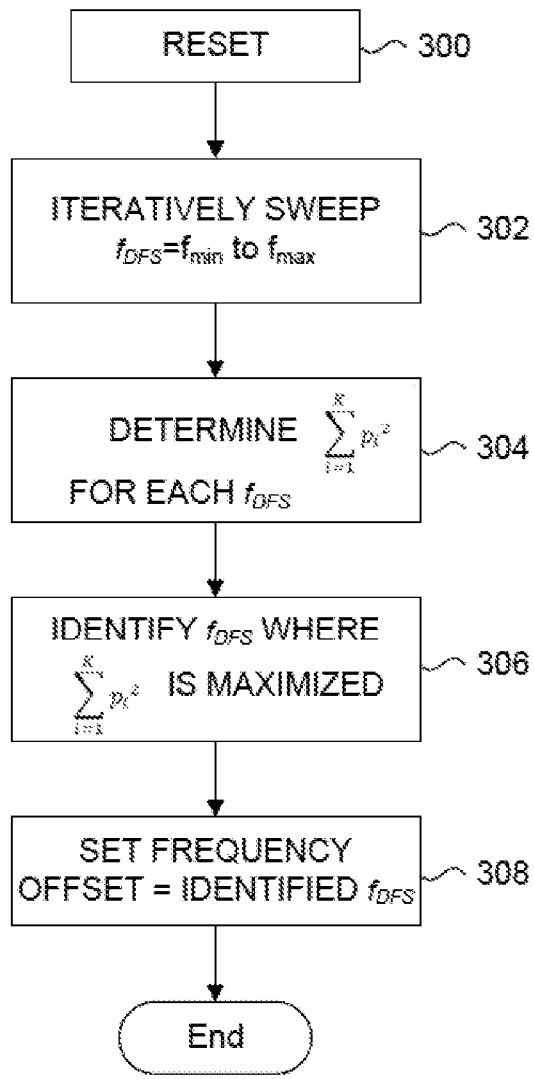
FIG. 8 is a flow chart of a method for estimating actual frequency offset, according to a present embodiment.

FIG. 8 is a flow chart which outlines the general method embodiment of estimating the actual frequency offset, as executed by FO estimator 212 of FIG. 6. More specifically, the circuits and logic of FO estimator 212 are configured for executing the method embodiment of FIG. 8. The method starts with a reset event at 300, which can include powering up the coherent receiver. Most coherent receiver specifications provided by the manufacturer indicate a coarse frequency offset error range $f_{coarse}$, such as 700 MHz for example. Alternately, a supplemental circuit can be used to provide a coarse estimate of the frequency offset with a similar error range. With this coarse frequency offset error range, a frequency sweep range of $f_{min}$ to $f_{max}$ is set, where $f_{min}$ is set as $-f_{coarse}$ and $f_{max}$ is set as $+f_{coarse}$. Also, a frequency step size is set based on the best resolution of the system. Then the method proceeds to 302 where the output data of carrier phase recovery circuit 208 is iteratively sampled at all the different frequencies f, where f is stepped, or swept, from $f_{min}$ to $f_{max}$ by the step size. More specifically, the $2^{nd}$ order PLL is provided with each different frequency for operating on the received signal.

Following at 304, $J_{DFS}(f_{DFS})=\Sigma p_i^2$ is calculated for each frequency iteration of $f_{DFS}$. Recall that $J_{DFS}$ is a PMF sum-square value. This PMF value and its corresponding frequency is stored in memory. Then proceeding to 306, the frequency having the largest $J_{DFS}$ value is identified. At 308, the actual frequency offset is set and provided to carrier phase recovery circuit 208 for normal receiving operation. Then the FO estimator 212 can be disabled or turned off as it is no longer required during normal operation of the coherent receiver. Therefore, the FO estimator 212 can be seen as operating during a signal acquisition phase of operation of the coherent receiver.

Figure 9:
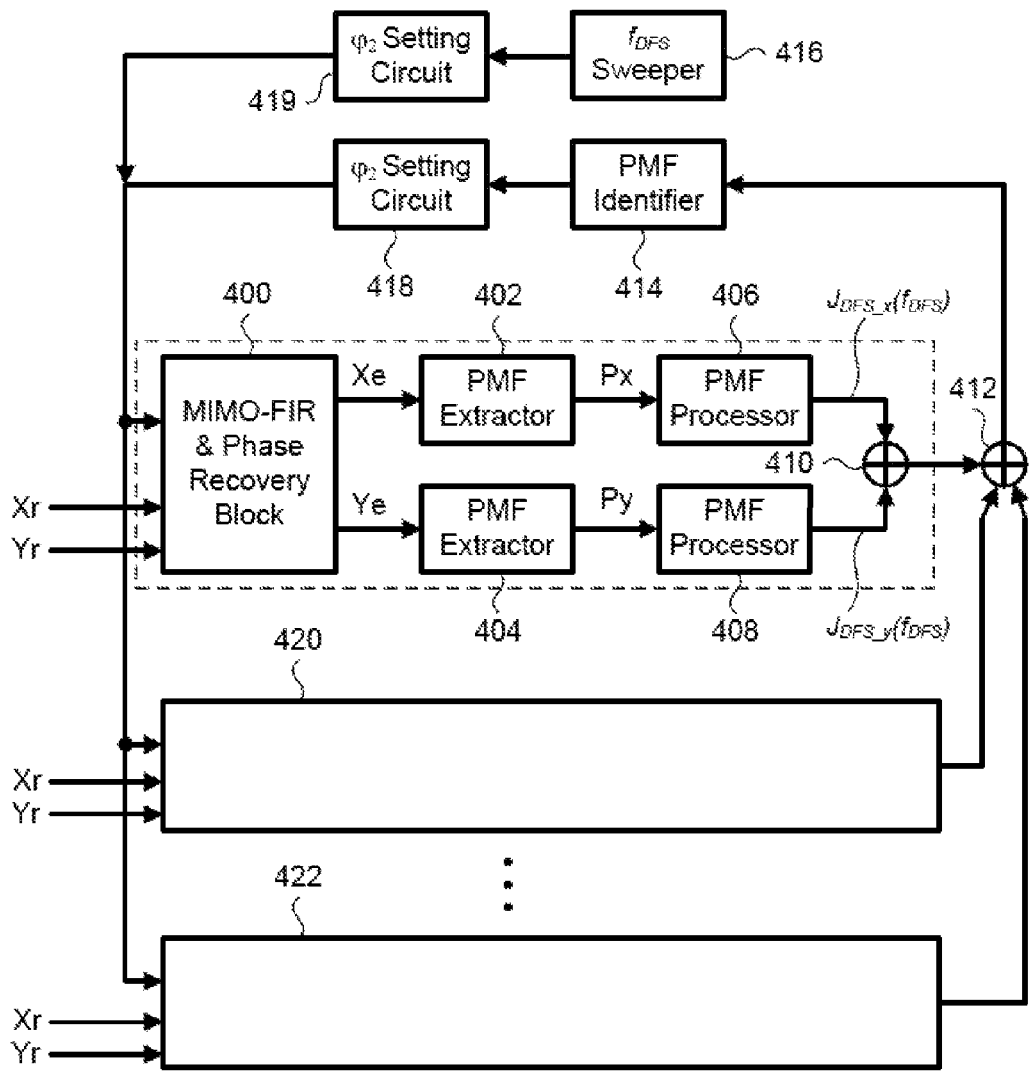
FIG. 9 is a block diagram of the FO estimator of FIG. 6, according to a present embodiment.

FIG. 9 is a block diagram showing an embodiment of the FO estimator 212 of FIG. 6, according to a present embodiment. In order to simplify the schematic, block 400 is a combination of both MIMO-FIR 206 and carrier phase recovery circuit 208 of FIG. 6, and is simply referred to as the MIMO-FIR and phase recovery block 400.

The present FO estimator embodiment includes PMF extractors 402, 404, PMF processors 406, 408, a local summer 410, a global summer 412, a max PMF identifier 414, a frequency sweeper 416 and frequency offset setting circuits 418 and 419. PMF extractor 402 and PMF processor 406 operate on one polarization of the received signal while PMF extractor 404 and PMF processor 408 operate on another polarization of the received signal. The group of circuit blocks 400, 402, 404, 406 and 408 can be referred to as a single PMF processing branch. Some coherent receivers may have multiple PMF processing branches having circuit blocks identical to circuit blocks 400, 402, 404, 406 and 408, but operating concurrently on different sets of data. Such a level of parallelism can be used when a single processor branch is not fast enough to process the stream of input data. Following is a discussion of PMF extractors 402, 404, PMF processors 406, 408, max PMF identifier 414, frequency sweeper 416 and frequency offset setting circuits 418 and 419.

During the signal acquisition phase of operation, the frequency sweeper 416 is responsible for setting different $f_{DFS}$ frequencies at predetermined step sizes, and executes the frequency sweeping function discussed at step 302 of the method embodiment of FIG. 8. Once $f_{DFS}$ is set, frequency offset setting circuit 419 will set $\phi_2$ using the $f_{DFS}$ set by frequency sweeper 416. The MIMO-FIR and phase recovery block 400 then operates using the set $\phi_2$, and provides a polarized signal (Xe) to PMF extractor 402, where the PMF of the equalized signal phase is extracted for each frame of a data burst, at the specific $f_{DFS}$ frequency. This can be done for each symbol, by having circuits detect the phase and identi-fying which sectors of the phase constellation the phases are distributed (i.e. as shown in FIG. 3A and FIG. 3B). PMF extractor 402 tracks the number of times a phase is identified in each sector out of K sectors. Table 1 below shows an example extracted PMF of phases of symbols with K=10, where the left-most column identifies a K identifier, the middle column lists the constellation range for the corresponding sector, and the right-most column lists the count for identified phases of symbols in each of the phase constellation sectors.

TABLE 1

| K | Phase Constellation Sectors | Count ($p_i$) |
|---|---|---|
| 1 | 0 to $\pi/5$ | 5 |
| 2 | $\pi/5$ to $2\pi/5$ | 3 |
| 3 | $2\pi/5$ to $3\pi/5$ | 8 |
| 4 | $3\pi/5$ to $4\pi/5$ | 6 |
| 5 | $4\pi/5$ to $\pi$ | 6 |
| 6 | $\pi$ to $6\pi/5$ | 4 |
| 7 | $6\pi/5$ to $7\pi/5$ | 3 |
| 8 | $7\pi/5$ to $8\pi/5$ | 5 |
| 9 | $8\pi/5$ to $9\pi/5$ | 4 |
| 10 | $9\pi/5$ to $2\pi$ | 9 |

As more symbols are evaluated by PMF extractor 402, the counts will increase. Using the previous example of FIG. 3A where a uniform phase distribution is observed, the counts in Table 1 for all the sectors will be substantially close to each other. On the other hand, using the previous example of FIG. 3B where a non-uniform phase distribution is observed, the counts across all K sectors are not close. Once a specific amount of symbols have been evaluated, such as one frame of symbols, the collected counts are then provided to PMF processor 406. PMF processor 406 then executes the mathematical function of $J_{DFS\_x}(f_{DFS})=\Sigma p_i^2$ at the present offset frequency of $f_{DFS}$, which corresponds to step 304 of FIG. 8. Using the example of Table 1, $J_{DFS\_x}(f_{DFS})=5^2+3^2+8^2+6^2 \ldots +4^2+9^2$. PMF extractor 404 and PMF processor 408 operate concurrently on the other polarization with PMF extractor 402 and PMF processor 406 in exactly the same way, except that PMF processor 408 provides $J_{DFS\_y}(f_{DFS})$. Both $J_{DFS\_x}(f_{DFS})$ and $J_{DFS\_y}(f_{DFS})$ are simply added together at local summer 410 to yield $J_{DFS\_xy}(f_{DFS})$ as both polarizations are facing the same frequency offset. It is noted that PMF extractor 404 and PMF processor 408 are not required, but are included in the present embodiment to improve accuracy of FO estimation.

Assuming that the other PMF process branches 420 and 422 are not present, or not being used, the PMF processor output $J_{DFS\_xy}(f_{DFS})$ is provided to max PMF identifier 414. The max PMF identifier 414 keeps track of greatest $J_{DFS\_xy}(f_{DFS})$ value and the corresponding $f_{DFS}$ that resulted in it. This generally corresponds to step 306 of FIG. 8. This iteration for one $f_{DFS}$ is now complete, and frequency sweeper 416 changes $f_{DFS}$ to the next frequency. This next frequency can be the previous frequency plus a predetermined step size, and is referred to as the next frequency index. The previously described operations of PMF extractors 402, 404 and PMF processors 406, 408 then repeats again such that a new $J_{DFS\_xy}(f_{DFS})$ is provided to max PMF identifier 414. Eventually $J_{DFS\_xy}(f_{DFS})$ at all frequency indices within the range of $f_{min}$ to $f_{max}$ are provided, and max PMF identifier 414 then sets the actual frequency offset to be the frequency where the largest $J_{DFS\_xy}(f_{DFS})$ value occurred. This corresponds to step 308 of FIG. 8. Now the frequency offset setting circuit 418 is set using this actual frequency offset and the signal acquisition phase ends so that normal receiving operations can proceed. In summary, the FO estimator of the embodiment of FIG. 9 processes PMF of the equalized symbols to provide a summation of square of PMF values at different frequencies, and identifies one frequency corresponding to a maximized summation of square of PMF values.

In alternate embodiments, any one or more of parallel PMF processing branches 420 and 422 can be used to improve accuracy of the final $J_{DFS\_xy}(f_{DFS})$ values. Since each PMF processing branch is operating at the same $f_{DFS}$ and ($p_2$ but on different sets of data, the global summer 412 is used to add the $J_{DFS\_xy}(f_{DFS})$ values from the output of each PMF processing branch together. This global $J_{DFS\_xy}(f_{DFS})$ value is provided to max PMF identifier 414, and the process is repeated again for a different $f_{DFS}$. More data allows for a larger difference between a $J_{DFS\_xy}(f_{DFS})$ value from a uniform phase distribution and a $J_{DFS\_xy}(f_{DFS})$ value from a non-uniform phase distribution corresponding to the actual frequency offset. It should be appreciated that such a larger difference is easier to detect. In fact, a single pairing of one PMF extractor 402 and one PMF processor 406 is sufficient for estimating the FO, and different pairings from any combination of PMF processing branches 420 and 422 can be concurrently active in the FO estimation embodiments.

Accordingly, further robustness can be gained by having the FO estimator 212 process multiple bursts of blocks, instead of just a single burst of blocks. In summary, the final $J_{DFS\_xy}(f_{DFS})$ for all parallel PMF processing branches can be expressed with equation 1 below:

$$J_{DFSTOTAL}(f_{DFS}) = \sum_{burst=1}^{nBursts} \sum_{processor=1}^{nProc} \sum_{j=1}^{nPol} \sum_{i=1}^{K} p_1^2(f_{DFS}) \quad \text{Equation 1}$$

where K is the resolution of PMF of signal phase; nPol is the number of polarizations that is 2 for polarization multiplexed systems and 1 for single polarization transmission; nProc is the number of parallel TDEQ and CR processors or branches in the DSP; nBursts is number of bursts of blocks involved in each calculation, where nBursts should be set based on the system specifications.

Figure 10:
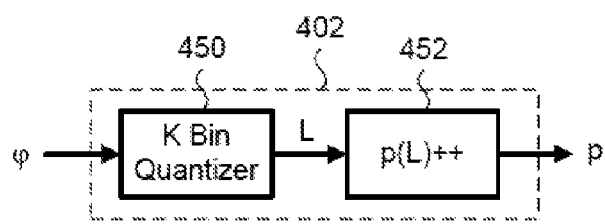
FIG. 10 is a block diagram of the PMF extractor of FIG. 9, according to a present embodiment.

FIG. 10 is a block diagram showing further details of PMF extractors 402 or 404, according to a present embodiment. In this embodiment, PMF extractor 402 includes a K bin quantizer 450 and a counters block 452. The K bin quantizer 450 is responsible for detecting a phase of the input signal and then determining which of the K sectors, or phase bins, the phase belongs in. The p(L)++ circuit 452 is a counters block, which can include memory or registers for keeping count of the number of instances a phase is detected as belonging in a particular phase bin (or K sector). Alternately, K bin quantizer 450 can be implemented as a look up table (LUT). For example, by multiplying the detected phase $\phi$ with $K/(2\pi)$ ($\phi \times K/(2\pi)$), the resulting value can be rounded to correspond with a table having K entries. For example, if round($\phi \times K/(2\pi)$)=3, then the K=3 entry in the table is incremented by 1. In both embodiments, memory is required to store the counts.

The previously discussed embodiments of the FO estimator, such as the one shown in FIG. 9 by example, can be used in an optical coherent transportation link. Such an optical coherent transportation link was previously shown in the embodiment of FIG. 5. The presently described optical coherent transportation link embodiment would include the transmitter 102, the optical channel 106 and the coherent receiver 104. The transmitter 102 generates an optical signal, which is received and transported by the optical channel 106. The transmitter 102 can be located at a source location such as a service provider 10, a regional node 14 or a base station 16 as shown in FIG. 1, and the optical channel 106 can be represented by the data cables 18, 20 and 22.

The coherent receiver 104 receives the optical signal from the optical channel 106, and is configured to provide equalized symbols corresponding to the optical signal using circuits such as frequency domain equalizers (FDEQ) 202 and 204 and MIMO-FIR 206, previously shown in the embodiment of FIG. 6. The coherent receiver 104 would include a frequency offset estimator such as the frequency offset estimator 212 embodiment of FIG. 6 and the embodiment of FIG. 9, and a carrier phase recovery circuit such as the one shown by the carrier phase recovery circuit 208 embodiment of FIG. 6. The FO estimator in the presently described optical coherent transportation link embodiment processes probability mass function (PMF) of the equalized symbols for the purposes of providing a summation of square of PMF values at different frequencies, and identifies one frequency corresponding to a maximized summation of square of PMF values. The carrier phase recovery circuit in the presently described optical coherent transportation link embodiment corrects a phase of the equalized symbols based on the identified one frequency.

Figure 11:
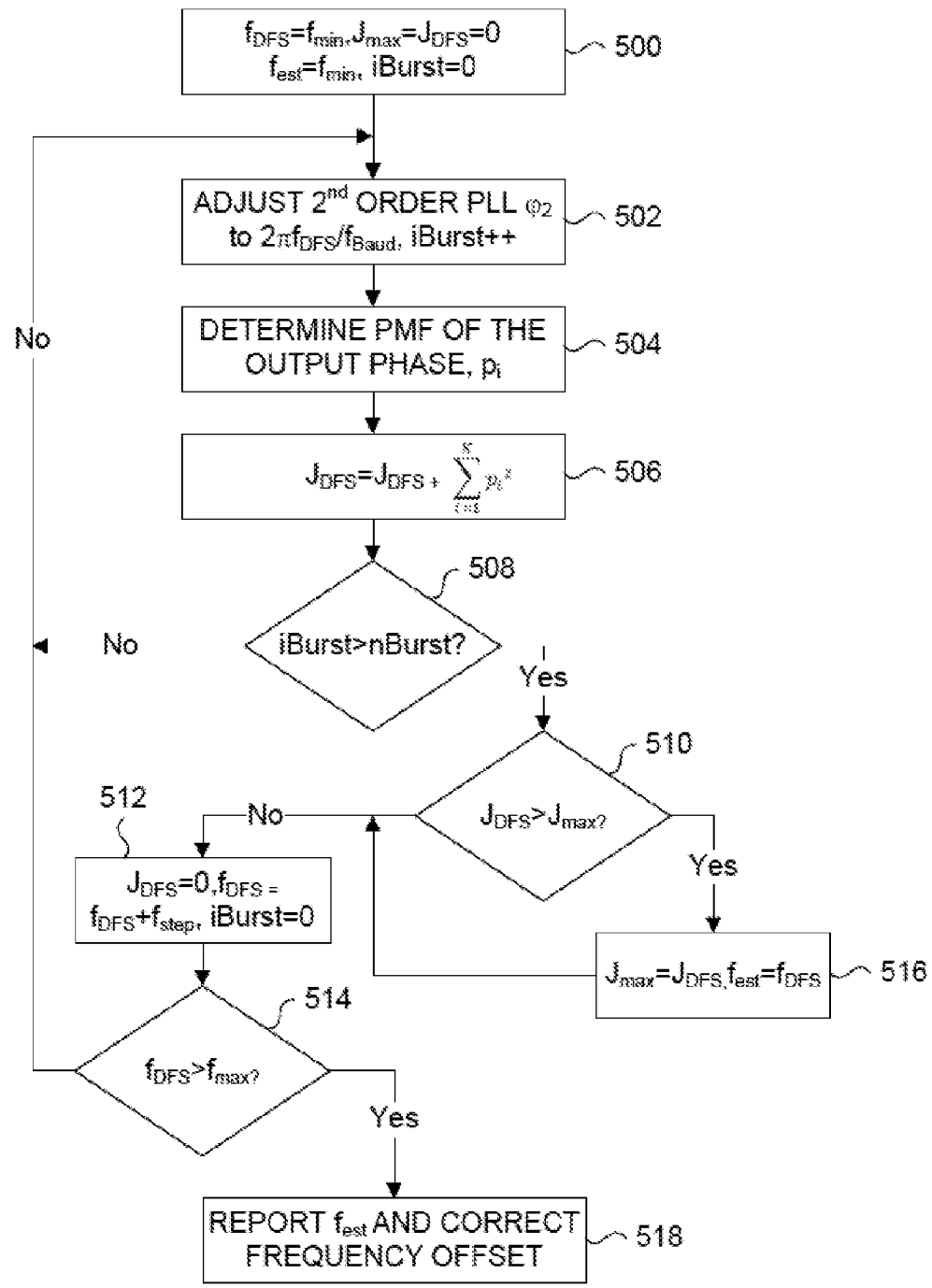
FIG. 11 is a flow chart of a method for estimating actual frequency offset of a signal, according to a present embodiment; and, FIG. 12 is a plot of experimental data using the previously described frequency offset estimation embodiments.

FIG. 11 is a detailed flow chart of an embodiment of the method for estimating actual frequency offset of a signal in a coherent receiver using PMF of signal phase. For example, the following method embodiment can be executed in the circuits shown in FIGS. 5, 6 and 9. More specifically, the method embodiment of FIG. 11 can be executed in the DSP 118 of the embodiment of FIG. 5, in the FO estimator 212 of the embodiment of embodiment of FIG. 6, and in the PMF extractor embodiment of FIG. 9. The method begins at 500 after a reset event, where $f_{DFS}$ is set to $f_{min}$, $J_{max}$ and $J_{DFS}$ are set to 0, $f_{est}$ is set to $f_{min}$, and iBurst is set to 0. The variable $f_{est}$ will eventually be the actual frequency offset, while $f_{min}$ is the minimum frequency to use, $J_{max}$ stores the greatest PMF value, and the PMF sum-square value $J_{DFS}$ is a currently evaluated PMF processor output. Following at 502, $\phi_2$ is set to $2\pi \times f_{DFS}/f_{Baud}$ for the $2^{nd}$ order PLL of the carrier phase recovery circuit 208, and the iBurst value is incremented. By example, the MIMO-FIR and phase recovery block 400 is now set to operate with the $\phi_{FDS}$ and $\phi_2$ values. As output symbols are provided from MIMO-FIR and phase recovery block 400, the PMF of the output phase for each symbol is determined, and represented as $p_i$. This is where counts of the phase in each of the K sectors of the phase constellation sectors are accumulated. Following at 506, a PMF processor calculation of $J_{DFS}=J_{DFS}+\Sigma p_i^2$ is executed for the current burst of blocks. If at 508 the current burst number iBurst is not greater than a maximum burst number nBurst, then the method returns to 502 to receive a subsequent burst of blocks to evaluate. As the method loops through 502, 504 and 506 under the same $f_{DFS}$ and $\phi_2$ settings for each successive burst of blocks, $J_{DFS}$ continues increasing in value.

Once current burst number iBurst is greater than a maximum burst number nBurst, then the method proceeds to 510. A comparison between the current $J_{DFS}$ and $J_{max}$ is made at 510. Because this first iteration has $J_{max}=0$ and $J_{DFS}$ is surely >0, $J_{max}$ is set as $J_{DFS}$, and $f_{est}$ is set as $f_{DFS}$ at 516. In other words, the maximum $J_{DFS}$ is recorded with its corresponding frequency, and any previous lower $J_{DFS}$ and corresponding frequency value is discarded or ignored. If at 510 $J_{DFS}$ is less than $J_{max}$, then the current $f_{DFS}$ frequency is of no interest, and the method proceeds to 512 where parameters $J_{DFS}$ and iBurst are reset to 0, and $f_{DFS}$ is incremented by the predetermined frequency step size. A comparison of the newly incremented $f_{DFS}$ is compared to $f_{max}$ at 514. If $f_{DFS}$ has not exceeded $f_{max}$, then there are still more frequencies to determine PMF of the output phase at, so the method returns to 502 with a new $f_{DFS}$ value. Otherwise, the method proceeds to 518 as all the frequency indices have been swept. By 518, the largest $J_{DFS}$ value has been stored as $J_{max}$, and its corresponding frequency has been stored as $f_{est}$, which is reported and set as the actual frequency offset for the coherent receiver. Normal receiving operation of the coherent receiver can now proceed.

Figure 12:
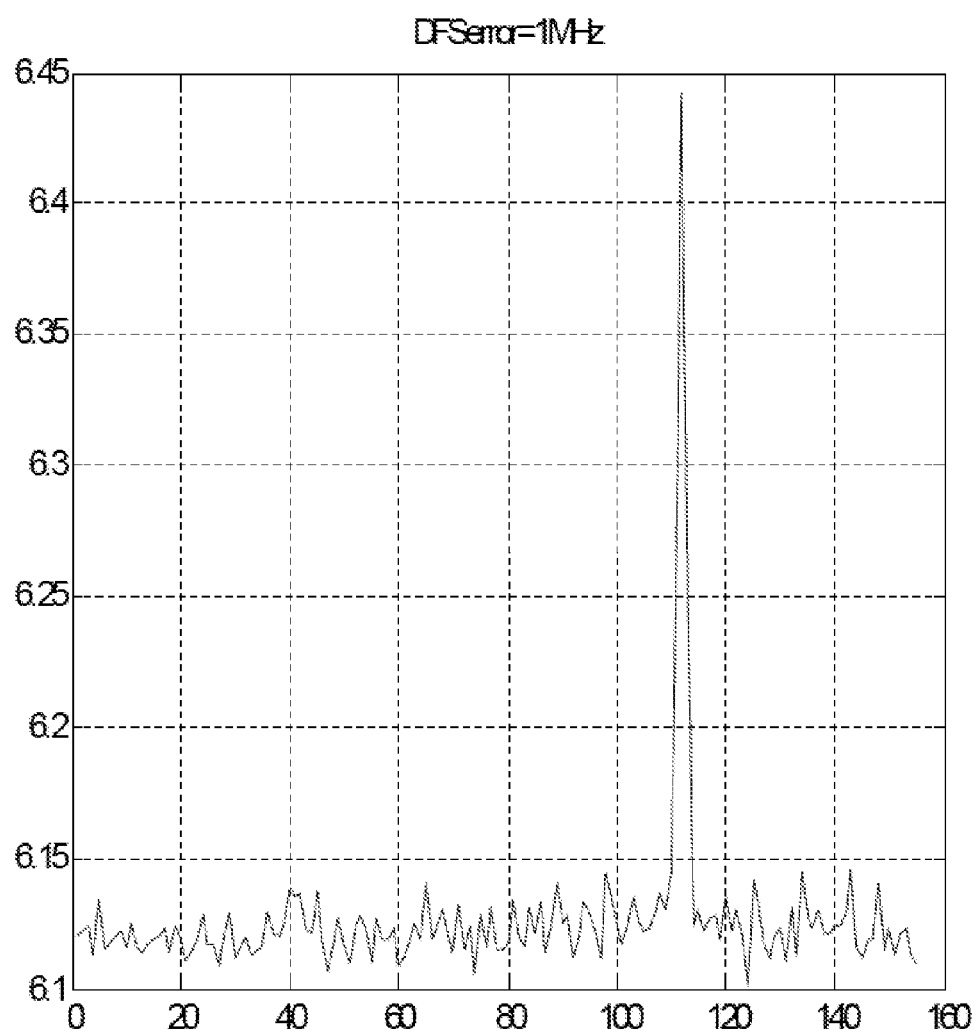

The previously described FO estimator embodiments have been implemented and tested to demonstrate the effectiveness of using PMF of signal output phase for estimating the actual frequency offset of a signal received by a coherent receiver. FIG. 12 is a plot of the PMF processor output ($J_{DFS}$) at different $f_{DFS}$ frequencies using the previously described embodiments. The single peak value is clearly evident in FIG. 12, and the frequency offset error is about 1 MHz, well below the tolerated maximum of 10 MHz. In similar test using prior art frequency offset estimation methods, the estimation error is much larger than the tolerable limits, and system fails to recover the data.

In summary, the previously described frequency offset estimation method embodiment and system embodiment for coherent digital receivers estimates the offset frequency with higher speed, more robustness and accuracy over currently known methods. The present embodiments using PMF of signal phase can be used with any type of signaling, such as for example RRC, RC, NRZ and RZ67. The present embodiments using PMF of signal phase are compatible with all modulation schemes, including for example BPSK, QPSK, 8QAM, 16QAM and 64QAM, and with all pre-codings, pre-compensations, quantizations, and different sources of noises which can include ASE and phase noise by example. The present embodiments are compatible with any DSP algorithm, insensitive to narrow electrical bandwidth, large number of WSS, larger LOFO, large ASE and large channel impairments. The present embodiments are not complex, are hardware friendly, and features fast convergence as less bursts are required to determine the offset frequency.

The previously described embodiments have been illustrated in the context of polarization-multiplexed coherent optical transmission, however, they can be used in single-polarization coherent optical transmission as well. Furthermore, the previously described embodiments can be used in traditional wired and wireless communications systems that use a coherent receiver. More specifically, any coherent system can include the FO estimator circuits taught in the previous embodiments, and with an existing frequency corrector, can sweep the range of all possible operating frequencies. Based on the PMF sum-square output, referred to as the PMF processor output, FO can be estimated.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A method for estimating a frequency offset of a signal received at a coherent receiver, comprising:
   iteratively receiving equalized symbols at different frequencies;
   processing probability mass function (PMF) of the equalized symbols to provide a summation of square of PMF values at each of the different frequencies;
   identifying one frequency corresponding to a maximized summation of square of PMF values; and
   setting the frequency offset as the one frequency.

2. The method of claim 1, further comprising,
   resetting the coherent receiver before iteratively receiving equalized symbols in a signal acquisition phase of operation; and
   operating the coherent receiver with the frequency offset in a normal phase of operation.

3. The method of claim 1, wherein processing includes detecting phases of a frame of a data burst; and
   identifying in which K sectors of a phase constellation the detected phases are distributed, wherein K is a finite integer greater than 1.

4. The method of claim 3, wherein processing further includes counting the distribution of the detected phases.

5. The method of claim 4, wherein processing further includes calculating a summation of square of the distribution of the detected phases, the summation of square of the distribution of the detected phases corresponding to the summation of square of PMF values.

6. The method of claim 5, wherein said identifying one frequency includes storing the summation of square of PMF values for each of the different frequencies.

7. The method of claim 6, wherein said identifying one frequency further includes comparing the summation of square of PMF values to each other to identify the maximized summation of square of the PMF values and the corresponding one frequency.

8. The method of claim 1, wherein the equalized symbols include symbols from first and second polarization components of the signal.

9. The method of claim 5, wherein processing further includes concurrently calculating a second summation of square of the PMF values corresponding to another set of data of the signal at the same frequency, and adding the summation of square of the PMF values and the second summation of square of the PMF values together.

10. A frequency offset estimator for a coherent receiver, comprising:
a probability mass function (PMF) extractor configured to determine phases of equalized symbols and to determine individual probability mass function values of the phases at each frequency within a range of frequencies;
a PMF processor configured to square and sum the individual probability mass function values to provide a summation of square of PMF values for each frequency; and
a PMF identifier configured to identify the largest summation of square of PMF values and a corresponding frequency, the corresponding frequency being an estimated frequency offset for the coherent receiver.

11. The frequency offset estimator of claim 10, wherein the PMF extractor includes a quantizer for detecting the phases and identifying in which K sectors of a phase constellation the detected phases are distributed, wherein K is a finite integer greater than 1.

12. The frequency offset estimator of claim 11, wherein the PMF extractor includes
counters for counting the distribution of the detected phases; and
a memory for storing counts of the distribution of the detected phases.

13. The frequency offset estimator of claim 12, wherein the PMF extractor and the PMF processor are a first PMF extractor and a first PMF processor, wherein the first PMF extractor receives equalized symbols corresponding to one polarization of a received optical signal and the first PMF processor provides a first summation of square of PMF values.

14. The frequency offset estimator of claim 13, further comprising a second PMF extractor and a second PMF processor, wherein the second PMF extractor receives equalized symbols corresponding to another polarization of the received optical signal and the second PMF processor provides a second summation of square of PMF values.

15. The frequency offset estimator of claim 14, further comprising a local summer for adding the first summation of square of PMF values to the second summation of square of PMF values to provide the summation of square of PMF values.

16. The frequency offset estimator of claim 14, wherein the first PMF extractor, the first PMF processor, the second PMF extractor and the second PMF processor are included in a first PMF processing branch for operating on a first set of data, and the frequency offset estimator further includes a second PMF processing branch operating on a second set of the data concurrently as the first PMF processing branch, to provide a third summation of square of PMF values and a fourth summation of square of PMF values.

17. The frequency offset estimator of claim 16, further comprising a summer for adding the first summation of square of PMF values, the second summation of square of PMF values, the third summation of square of PMF values and the fourth summation of square of PMF values to each other to provide the summation of square of PMF values.

18. An optical coherent transportation link, comprising:
a transmitter for generating an optical signal;
an optical channel configured to receive and transport the optical signal of the transmitter; and
a coherent receiver for receiving the optical signal from the optical channel and configured to provide equalized symbols corresponding to the optical signal, the coherent receiver including
a frequency offset estimator configured to process probability mass function (PMF) of the equalized symbols to provide a summation of square of PMF values at different frequencies, and configured to identify one frequency corresponding to a maximized summation of square of PMF values, and
a carrier phase recovery circuit configured to correct a phase of the equalized symbols based on the one frequency.

19. The optical coherent transportation link of claim 18, wherein the frequency offset estimator includes
a probability mass function (PMF) extractor configured to determine phases of the equalized symbols and to determine individual probability mass function values of the phases at each frequency within a range of frequencies;
a PMF processor configured to square and sum the individual probability mass function values to provide the summation of square of PMF values for each frequency; and
a PMF identifier for identifying the largest summation of square of PMF values and the corresponding frequency, the corresponding frequency being an estimated frequency offset for the coherent receiver.

20. The optical coherent transportation link of claim 19, wherein the PMF extractor includes
a quantizer for detecting the phases and identifying in which K sectors of a phase constellation the detected phases are distributed, where K is a finite integer greater than 1;
counters for counting the distribution of the detected phases; and
a memory for storing counts of the distribution of the detected phases.

* * * * *